United States Patent

Bradshaw

[15] 3,685,623

[45] Aug. 22, 1972

[54] ENCAPSULATED RIVET AND ANVIL ARRANGEMENT

[72] Inventor: Clayton H. Bradshaw, Lyndhurst, Ohio

[73] Assignee: Abex Corporation, New York, N.Y.

[22] Filed: Oct. 29, 1970

[21] Appl. No.: 84,968

[52] U.S. Cl.............192/107 R, 188/218 XL, 29/513
[51] Int. Cl..............................................F16d 13/60
[58] Field of Search..188/250 G, 218 XL, 73.1, 73.2; 192/107 R; 29/513, 512

[56] References Cited

UNITED STATES PATENTS

| | | | |
|---|---|---|---|
| 1,896,013 | 1/1933 | Reasoner | 188/250 G |
| 2,516,966 | 8/1950 | DuBois | 192/107 R |
| 1,789,133 | 1/1931 | Bluhn | 188/250 G |
| 2,916,123 | 12/1959 | Garmager | 192/107 R |

*Primary Examiner*—Benjamin W. Wyche
*Assistant Examiner*—Randall Heald
*Attorney*—David A. Greenlee

[57] ABSTRACT

For a high energy brake or clutch of the type having at least one carrier plate with apertures, friction assemblies each comprise a solid-metal cup or backing with relatively frangible friction material held thereby. Half the assemblies are characterized by each having a male rivet substantially encapsulated within the friction material. The other half is characterized by each assembly having an anvil substantially encapsulated within its friction material. During field assembly, the rivet is upset by the anvil. There is thus avoided usual rivet-access "holes," that is, usual absence of friction material, at "facing" sides of the assemblies.

7 Claims, 5 Drawing Figures

INVENTOR.
CLAYTON H. BRADSHAW
BY
Richard MacCutcheon
ATTORNEY.

ENCAPSULATED RIVET AND ANVIL ARRANGEMENT

BACKGROUND OF THE INVENTION

The present invention relates to high stress resistant fasteners, for example, rivets which have heretofore had ends upset by removable harder metal tool means for achieving securement of principal parts of an assembly. The invention is believed to have particular significance in connection with brake, clutch and like assemblies.

Many patents discuss the frangibility of high energy friction material comprising a pressed and sintered mix of predominately metallic powdered materials. Generally, such materials (or even resin bonded asbestos) cannot be riveted to anything directly.

For high energy applications, as on the brakes of large aircraft, no known adhesive can stand the duty or temperature involved. Sometimes the material is sinter-bonded to a flat steel backing which is later riveted to a carrier plate. At other times, weight reduction, economy, or other factors dictate the use of small steel cups for holding the friction material. Later such cups are riveted to the carrier. Either way, whether the "backing" be flat or cupped, clearance (for the rivet head and for riveting tooling) reduce design freedom, reduce amount of friction material per cup or unit of backing area, and tend to cause edge crumble of the friction material adjacent each hole periphery which then grows progressively larger.

An object of the present invention is to provide simple and inexpensive means for overcoming the above-mentioned difficulties.

DESCRIPTION OF EMBODIMENTS

Figure 1:
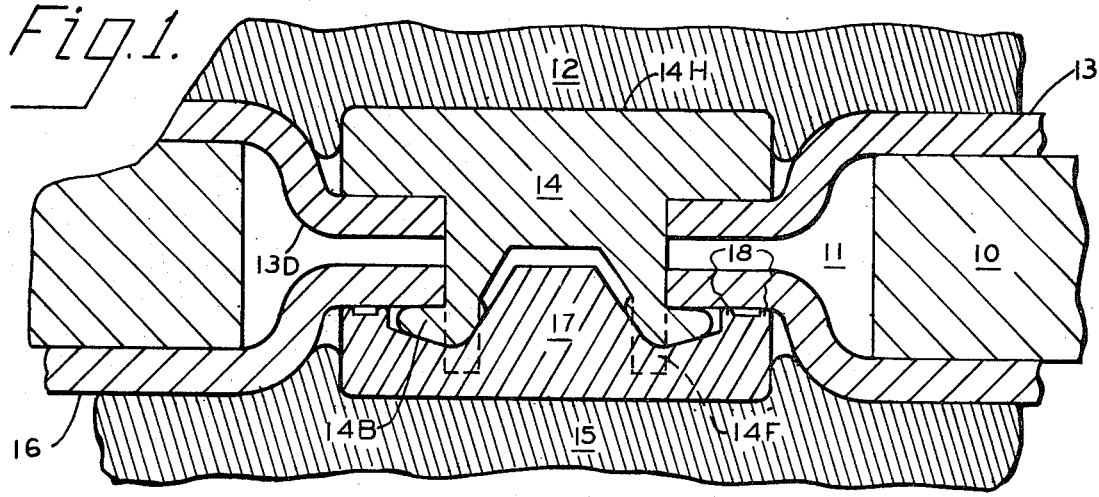
FIG. 1 is an enlarged cross-sectional view of the significant portion of a preferred embodiment.

In FIG. 1, a steel carrier plate 10 may be assumed to be a part of an aircraft brake.

Carrier plate 10 is provided with a plurality of circular apertures 11. Friction assemblies, hereafter described, are mounted back to back through the apertures 11.

One friction assembly comprises a sintered, or other, friction material 12 heat bonded or otherwise secured to a backing. By way of illustration, friction material 12 is shown held with respect to a steel cup having a bottom portion 13. Without deleterious effect the cup sidewalls (not shown) can wear down during use. To give greatest volume of friction material, the cup bottom may (optionally) have a depression 13–D. Usually there will be plural depressions (or at least plural rivets) for each cup though only one is shown in each drawing FIGS. 1 – 4.

A rivet 14 has a head 14–H and has a shank. The shank can be part hollow and annular. During initial assembly the rivet head 14–H is almost totally encapsulated within the friction material 12. Thus I regard the rivet as "substantially encapsulted" as those words are used in the claims hereafter.

Before, during and shortly after such initial or sub assembly and encapsulation, the rivet 14 shank protrudes through cup bottom or depression and one portion of the shank may have the shape indicated by the dash lines such as that labeled 14–F (for factory, first, or former).

As seen in FIG. 1, at the opposite side of carrier plate 10, another cup holds a friction material 15 and has a bottom 16. Optionally, composition of material 15 can be the same as or different from that of material 12. During factory assembly an anvil 17 is substantially encapsulated in material 15.

As is conventional for rivets and anvils, the anvil is of a material which is preferably hardened (or originally harder) or less ductile than the rivet material. But, as is not conventional, my anvil is not a removable tool usable from job to job. Even though it is preferably precision made (slope and shape being of great importance), my anvil is sacrificed, one for each two friction assemblies according to FIGS. 1 and 3. Perhaps "Pop-Rivets" (riveted all from one side), or other two-part rivets, could be said to have an anvil retained but no fastener known to me has (at the time of riveting) all principal parts already substantially embedded.

In some uses, friction material 15 might wear down so far that the anvil would drop off. This could be undesirable in a brake or clutch, but is readily obviated by electric (or other heat) welding of anvil 17 to backing 16. The projections 18 shown in FIG. 1 can facilitate such welding.

Having differing factory-made assemblies, such as (male) 12, 13, 14 and (female) 15, 16, 17, at hand, it is easy for those in the art, perhaps at another factory, perhaps at an airplane hangar, to press the assemblies together with conventional equipment. The soft metal of the rivet then takes the form of the bulbous projection 14–B. Surprisingly, the frangible friction material does not crack due to the requisite pressure. Perhaps this is because the friction material is weak only in shear and not as to compression. Possibly it is because of the vast difference in areas (hence psi) of cup held material pressing on anvil as contrasted with tiny effective slope portion of the anvil. At any rate, the rivet upsets without friction material degrading.

In the other figures, like functioning parts are like numbered as in FIG. 1.

Figure 2:
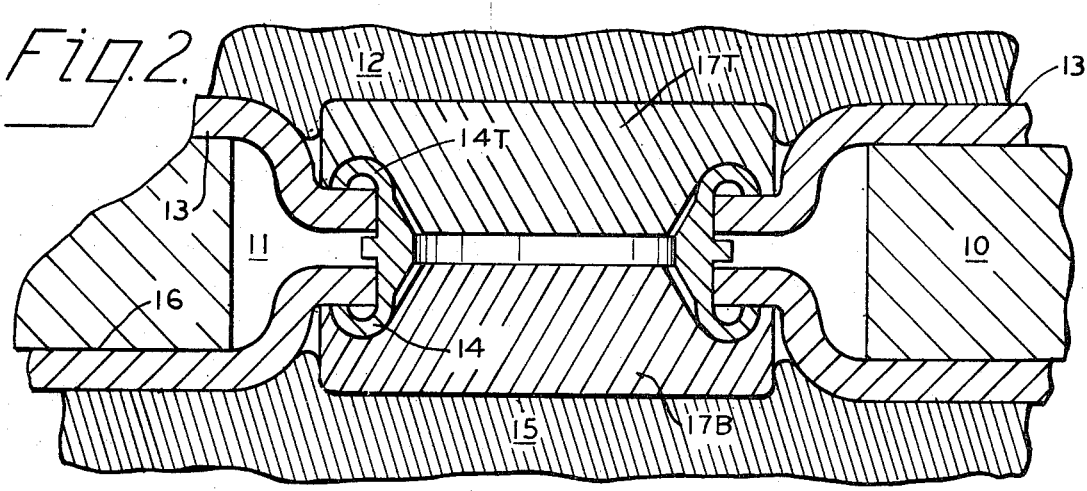
FIGS. 2 and 3 show modifications.

In FIG. 2, two hardened (e.g., carbonized) anvils may be used. Top anvil 17–T is embedded in f.m. 12. Bottom anvil 17–B is embedded in f.m. 15. Rivet 14 could originally have been a part having the general form of a small cylinder. One end 4–T may have next been factory upset leaving a male protrusion at bottom. Its other end may later have been upset during field assembly to carrier plate. Or, as by supplying rivets separately, identical friction assemblies, each of f.m., cup, and embedded anvil, can be shipped to those in the field.

The FIG. 1 and FIG. 2 arrangements seem workable even if "softness" of rivet and anvil are the same, but, as is conventional and for clarity, a hard metal "anvil" was assumed.

Figure 3:
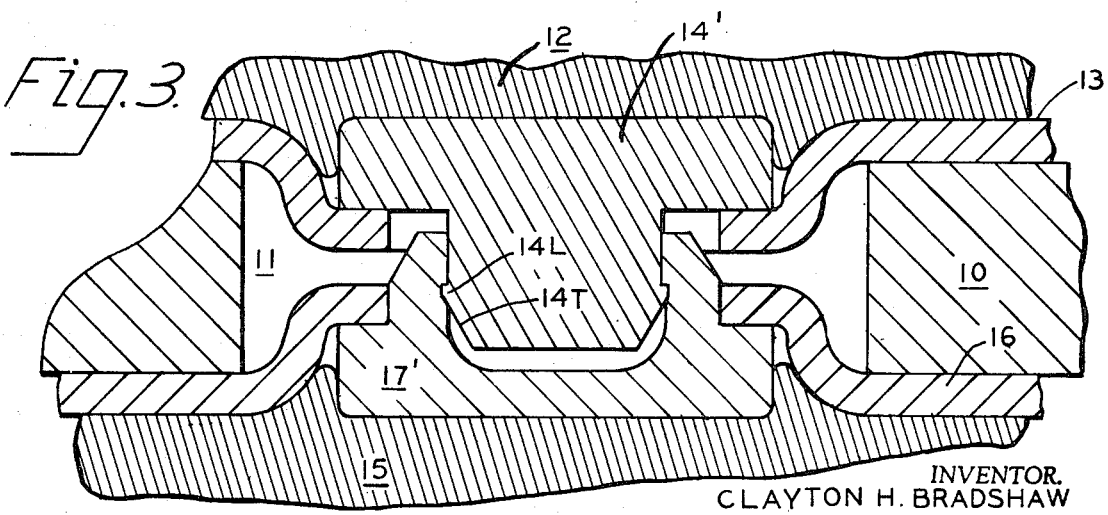
Figure 4:
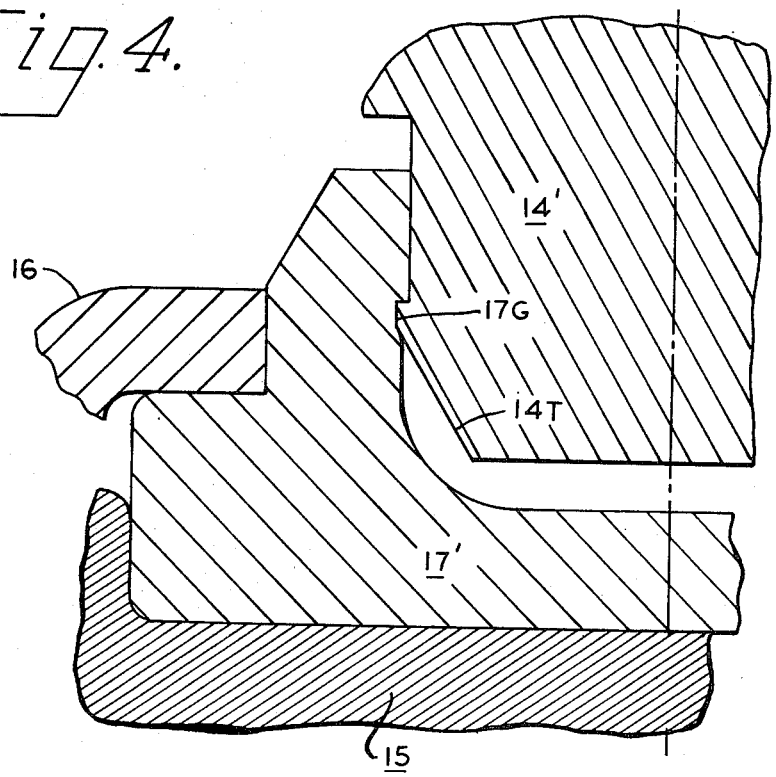
FIG. 4 is a blown-up view (e.g. 15 x actual parts' size) of a portion of FEG. 3.

For FIGS. 3 and 4, the composition of the parts is reversed (i.e., opposite that in the other Figures). "Rivet" 14′ is hard, for example, 50 to 55 on the Rockwell "C" Scale. The relatively hard rivet has a shank terminal taper 14T and a ridge or lip portion 14L. One could regard it as an anvil if he wished.

The other part, the lower half of the FIG. 3, FIG. 4 fastening means, we can for convenience call an anvil, 17', but it is actually a relatively soft collar, e.g. 10 to 20 R.C. Its useful inner diameter was originally straight up-and-down. But, during final assembly, the relatively hard lip 14L dug a progressively advancing (because of soft metal flow) groove in the soft metal. The final position of the groove is at 17G as shown. While perhaps having little practical relevance to the principal uses intended, I have found that similar shaped parts, one of soft and the other of softer synthetic plastic material, are easily pushed together manually, but are impossible to then pull apart, after the harder material has dug into the soft and caused it to flow.

For fastening even a single cup, the art usually prefers plural rivets. Thus, two rivets will provide better moment arms (to prevent turning or loosening) than would one.

Figure 5:
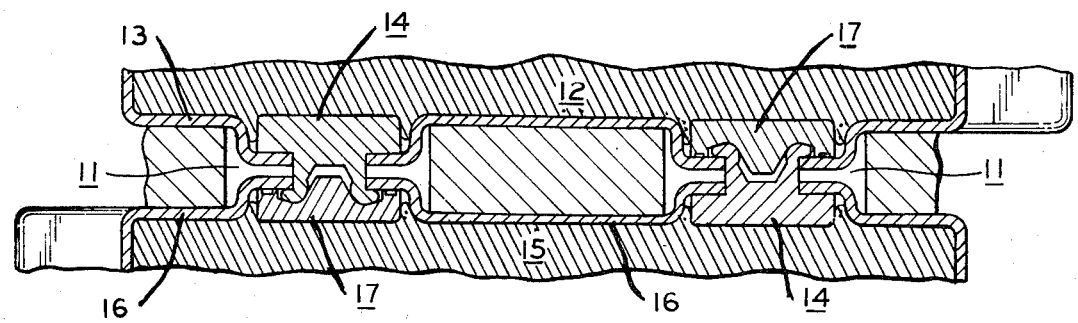
FIG. 5 is a cross-section of a preferred arrangement.

FIG. 5 shows a hermaphroditic arrangement where cup 13 held material 12 encapsulates a rivet 14 and also an anvil 17. Secured thereto is an identical arrangement turned over, which is what the bottom assembly, of cup 16, another anvil 17 and another rivet 14, amounts to.

With the arrangement of FIG. 5, identical assemblies (for both halves and without any necessity of supplying rivets separately) can be shipped. An this is true even if the cups are not symmetrical end-for-end; it is true even if the cups are not round nor rectangular but are, instead, semi-rectangular with a skew or off-radial-bias in cup outline at one end.

There is thus provided an invention of the class described capable of meeting the object set forth and affording 1. more work material area,
2. less danger of damage to work material,
3. adaptation both to existing factory equipment and to existing field maintenance equipment as regards friction assemblies of the type to be secured back to back through an aperture in a brake (or clutch) carrier plate.

"Soft" and "hard" as used in the claims for metal material are meant to be relative each with respect to the other and not necessarily relative to anything else.

"One" and "other," as used in the claims, are to be considered as referring to either like composition materials or unlike materials.

While I have illustrated and described particular embodiments, various modifications may obviously be made without departing from the true spirit and scope of the invention intended to be defined only by the appended claims taken with all reasonable equivalents.

I claim:

1. In a friction device including a carrier member and a pair of friction assemblies each having an outer friction face and each having an inner face contacting the carrier member, the improvement comprising cooperating metallic fastening means mounted to the friction assemblies facing inwardly of the inner faces thereof, and including at least one relatively hard metal portion and at least one relatively soft metal portion plastically deformable thereby upon application of a force squeezing the friction device together and including means for retaining the deformed portion to secure the metal portions together and thereby clamp the carrier member between the friction assemblies.

2. The improvement of claim 1, wherein the cooperating fastening means comprise a relatively soft male member mounted to the inner face of one of the friction assemblies and projecting from the face thereof, and a relatively hard female member having a surface for deforming a portion of the male member and being so mounted to the inner face of the other friction assembly to define therewith a recess for receiving and retaining the deformed male member portion.

3. The improvement of claim 1, wherein the cooperating fastening means comprise a relatively hard female member mounted to the inner face of each friction assembly and a relatively soft male member, each female member having a surface for deforming a portion of the male member and each female member forming with its friction assembly a recess for receiving and retaining a deformed male member portion.

4. The improvement of claim 1, wherein the cooperating fastening means comprise a relatively hard male member mounted to the inner face of one of the friction assemblies and having a projecting deforming portion, and a relatively soft female member mounted to the inner face of the other friction assembly and having a chamber receiving the male member portion, the chamber including surfaces deformed by the male member portion for retention thereof.

5. In a friction device including a carrier plate and a pair of friction assemblies each having an outer friction facing mounted on an apertured metal backing plate which contacts the carrier plate, the improvement comprising a relatively soft metal fastener carried by one of the backing plates in alignment with an aperture and having a deformable portion, a relatively hard metal fastener carried by the other backing plate in alignment with an aperture and having a surface for plastically deforming the deformable portion upon forcible contact therewith when the friction device is squeezed together, and retaining means on said other backing plate for retaining the deformed portion to secure the fasteners together and clamp the carrier plate between the backing plates.

6. The improvement of claim 5, wherein the relatively soft metal fastener is a rivet having a head clamped between the one backing plate and its friction facing and a hollow shank projecting through the aperture to form the deformable portion, and the relatively hard metal fastener is an anvil having a tapered annular surface aligned with the aperture for deforming the shank and a body portion clamped between the other backing plate and its friction facing at a point spaced from the aperture periphery to form therewith a recess comprising the retaining means for the deformed shank.

7. The improvement of claim 5, wherein the backing plates each carry a plurality of the cooperating metal fasteners to provide a plurality of means clamping the carrier plate between the backing plates.

* * * * *